(12) United States Patent
Park

(10) Patent No.: US 7,037,054 B2
(45) Date of Patent: May 2, 2006

(54) APPARATUS FOR FORMING GROOVE USED IN CUTTING BLADE

(76) Inventor: Hong-Soon Park, 399-6, Mangwon-1Dong, Mapo-Gu, Seoul (KR) 121-821

( * ) Notice: Subject to any disclaimer, the term of this patent is extended or adjusted under 35 U.S.C. 154(b) by 116 days.

(21) Appl. No.: 10/504,229

(22) PCT Filed: Feb. 17, 2003

(86) PCT No.: PCT/KR03/00323

§ 371 (c)(1),
(2), (4) Date: Aug. 10, 2004

(87) PCT Pub. No.: WO03/070435

PCT Pub. Date: Aug. 28, 2003

(65) Prior Publication Data

US 2005/0084356 A1  Apr. 21, 2005

(30) Foreign Application Priority Data

Feb. 20, 2002 (KR) .................... 10-2002-0009136
Jan. 30, 2003 (KR) .................... 10-2003-0006289

(51) Int. Cl.
   *B23D 37/00* (2006.01)
(52) U.S. Cl. .................... 409/259; 409/269; 72/294; 83/865
(58) Field of Classification Search ............. 409/259, 409/265, 267, 268, 269, 270, 271, 276, 279, 409/280, 281, 286, 287, 278, 304, 307, 260, 409/261, 277; 72/17.3, 294, 307, 306, 388, 72/312, 214, 217, 319, 18.2; 83/865, 868, 83/875

See application file for complete search history.

(56) References Cited

U.S. PATENT DOCUMENTS

| | | | | |
|---|---|---|---|---|
| 3,570,356 A | * | 3/1971 | William et al. | ................ 83/693 |
| 3,696,655 A | * | 10/1972 | Hinks et al. | .................. 72/321 |
| 3,982,457 A | * | 9/1976 | Berry | ........................... 83/516 |
| 4,597,521 A | * | 7/1986 | Wilson | ......................... 83/303 |
| 5,150,996 A | * | 9/1992 | Thoroughman | .............. 409/259 |
| 5,463,890 A | * | 11/1995 | Tachibana | ..................... 72/294 |
| 5,984,600 A | * | 11/1999 | Gierth | ......................... 409/269 |
| 6,145,359 A | * | 11/2000 | Park | ............................ 72/17.3 |
| 6,629,442 B1 | * | 10/2003 | Park | ............................. 72/307 |

* cited by examiner

*Primary Examiner*—Boyer D. Ashley
*Assistant Examiner*—Dana Ross
(74) *Attorney, Agent, or Firm*—Gibbons, Del Deo, Dolan, Griffinger & Vecchione

(57) ABSTRACT

Disclosed is an apparatus for defining a bending or welding groove in a cutting blade. A pair of fixed blocks are fixed to a base of a cutting blade forming apparatus. A slider is slidably coupled to each fixed block, and a bit support block is slidably coupled to the slider. The slider and the bit support block are respectively operated by first and second operating mechanisms. First through fourth guide parts are formed on the fixed block, slider and bit support block, to constitute dovetail joints. The first guide parts of the fixed blocks and second guide parts of sliders are formed to have a slope, such that, as the sliders are lowered, they are horizontally moved toward each other. A lower portion of a broaching bit is formed as a supporting surface, and at least one broaching edge portion is formed above the supporting surface portion.

10 Claims, 10 Drawing Sheets

APPARATUS FOR FORMING GROOVE USED IN CUTTING BLADE

TECHNICAL FIELD

The present invention relates, in general, to an apparatus for defining a groove in a cutting blade and, more particularly, to an apparatus which defines a groove in cutting blades to allow the cutting blades to be easily bent to a right angle or an acute angle or be welded one with another to thereby create a T-shaped section, before they are formed into various configurations.

BACKGROUND ART

As well known to those skilled in the art, when making a box, a soft sheet such as paper, synthetic resin and the like, is initially cut through blanking and piercing processes to prepare an initial sheet product. The initial sheet product is tailored to a developed state of the box, and then, by folding and bonding the tailored sheet product, formation of the box is completed.

In the tailoring procedure which is initially implemented when making the box, a cutting blade formed to have a configuration corresponding to the developed state of the box is installed on a cutting blade holder which has a plate-shaped contour, so that a cutting edge of the cutting blade projects downward. The cutting blade holder is mounted to a ram of a press. In a state wherein many folds of sheets are placed on a die, by lowering and then raising the ram, the sheets are tailored into the desired configuration by the cutting blade.

The cutting blade is formed of a special steel having a thin band-shaped contour, the cutting edge is formed at one widthwise end of the cutting blade to extend in a lengthwise direction of the cutting blade. The conventional procedure for fabricating the cutting blade comprises the steps of forming the cutting edge by grinding one widthwise end of the blade, defining a bending groove or a bridging groove, and conducting bending and severing processes.

In connection with fabrication of a cutting blade, a bending process can be implemented as disclosed in Japanese Patent Laid-open Publication Gazette No. Heisei 8-99123. That is to say, the cutting blade is bent leftward or rightward in conformity with a size of a desired configuration under the control of a computer program. Concretely speaking, by finely moving in a controlled manner a movable bending member which is positioned at a distal end of a guide member, the cutting blade which is discharged in a fitted state by the guide member is properly bent.

However, in the Japanese Patent Laid-open Publication Gazette, when implementing the cutting blade fabricating procedure, for example, when it is necessary to bend the cutting blade at the right angle, over an area where the bending of the cutting blade takes place, since a compression stress is produced in an inner part of the cutting blade and a tensile stress is produced in an outer part of the cutting blade, a round of a certain radius is formed. Thus, it is difficult to bend the cutting blade at an accurate right-angle.

In other words, when bending the cutting blade, due to a characteristic of a metallic material, because the cutting blade is bent while forming the round of a certain radius, it is difficult to precisely bend the cutting blade at a desired angle. As a consequence, a problem is caused in that a fabrication error of a certain extent cannot but be accepted.

Therefore, when conducting a bending process of a cutting blade, particular attention must be paid to define a precise bending angle while not forming a round.

In this consideration, in Korean Utility Model Registration No. 155939 which is registered in the name of the present applicant, a cutting blade is formed using a thin band of a predetermined width, and a cutting edge is formed at one widthwise end of the cutting blade. In order to ensure that the cutting blade can be bent by a predetermined angle at a desired position to have the same configuration as a product to be cut, a groove is defined in the cutting blade to extend in a widthwise direction of the cutting blade. Hence, it is possible to bend at the desired position the cutting blade to various angles including a right angle and an acute angle, while not causing the formation of a round having a certain radius. It is illustrated that the bending groove is defined as a grinder or a bite (cutting tool) is lowered by a cylinder.

Nevertheless, in the case that the bending groove of the cutting blade is defined using the grinder, as the wear of a grinding stone proceeds, a sectional shape of the bending groove may be changed. Also, in the case that the bending groove of the cutting groove is defined using the bite, after the bending groove is defined, when the bite is returned to its initial position, since the bite is not retreated and returned in a direction opposite to its machining direction, the bite is raised in a state wherein it is brought into contact with the cutting blade. Due to contact between the bite and the cutting blade, frictional heat is generated to cause degradation of the bite.

Specifically, when defining the groove using the grinder or bite, since there is not provided a separate structure for supporting a machining area of the cutting blade, a bending phenomenon occurs in the cutting blade, whereby it is difficult to precisely define the groove in the cutting blade.

In Korean Patent No. 239943, there is disclosed an apparatus in which arc-shaped grooves for enabling bending of a cutting blade are defined on upper and lower surfaces of the cutting blade using grinding rolls which are rotated about a horizontal shaft.

In this apparatus, while the grinding rolls having a minimum length corresponding to a width of the cutting blade press the upper and lower surfaces of the cutting blade to define the bending grooves, since there is not provided a separate structure for supporting a machining area of the cutting blade, the machining area of the cutting blade is likely to be defined during machining, whereby it is difficult to precisely define the grooves in the cutting blade.

Further, in the case that the cutting blade is formed to have a T-shaped section, a quadrangular groove cannot be precisely defined at a predetermined position. Because it is difficult to grind one end of the cutting blade to have a semicircular sectional shape, a cutting blade portion cannot be precisely fixed to the cutting blade.

DISCLOSURE OF THE INVENTION

Accordingly, the present invention has been made keeping in mind the above problems occurring in the prior art, and an object of the present invention is to provide an apparatus for defining a groove in a cutting blade, in which the groove to be opened in a bending direction of the cutting blade is defined on one surface of the cutting blade with the other surface of the cutting blade supported by appropriate means, whereby deformation of the cutting blade is prevented and it is possible to precisely define the groove, and in which, after the groove is defined, a broaching bite is returned to its initial position while being retreated from the cutting blade not to be brought into contact with the cutting blade, whereby it is possible to prevent frictional heat from being generated due to contact between the bite and the cutting blade.

Another object of the present invention is to provide an apparatus for defining a groove in a cutting blade, in which a triangular bending groove can be defined using a single broaching bite, and a quadrangular groove for ensuring an increased strength when welding the other cutting blade in the quadrangular groove of one cutting blade to create a T-shaped section can be easily defined.

In order to accomplish the above objects, the present invention provides an apparatus for defining a groove in a cutting blade, comprising: a pair of fixed blocks fixed to a base of a cutting blade forming apparatus to be separated from each other by a predetermined distance, and formed on respective surfaces facing each other with first guide parts which extend in a vertical direction; a slider having a second guide part and a third guide part, the second guide part being formed on one surface of the slider and engaged with the first guide part of each fixed block in such a way as to be raised and lowered in the vertical direction, and the third guide part being formed on another surface of the slider, farthest from the one surface, to extend in the vertical direction; a bite support block having a fourth guide part formed on one surface thereof and a broaching bite fixed to another surface thereof farthest from the one surface, the fourth guide part being engaged with the third guide part of the slider in such a way as to be raised and lowered in the vertical direction; and first and second operating mechanisms for operating the slider and the bite support block, respectively, in the vertical direction.

The first guide part of the fixed block and the second guide part of the slider may have any configurations so long as they are slidably engaged with each other, and likewise, the third guide part of the slider and the fourth guide part of the bite support block may have any configurations so long as they are slidably engaged with each other. In this regard, it is preferred that the first guide part of the fixed block and the second guide part of the slider, and the third guide part of the slider and the fourth guide part of the bite support block constitute dovetail joints. Further, the first guide parts of the fixed blocks and second guide parts of sliders are formed to have a slope, in a manner such that, as the sliders are lowered, an interval measured therebetween is narrowed, and, as the sliders are raised, the interval is widened.

In order to allow horizontal movement of the slider and bite support block while the slider is moved in the vertical direction, opposite ends of the slider and bit support block are respectively formed with first and second horizontal grooves, and first and second slider blocks are provided to free ends of first and second piston rods of the first and second operating mechanisms and movably fitted into the first and second horizontal grooves, respectively. At this time, it is sufficient that, as in the case of the first through fourth guide parts, the first slider block is slidably engaged into the first horizontal groove, and the second slider block is slidably engaged into the second horizontal groove.

A lower portion of an edge of the broaching bite is formed as a supporting surface portion for supporting a side surface of the cutting blade, and at least one broaching edge portion having a triangular or quadrangular sectional shape is formed at an upper end of the supporting surface portion. Also, a plurality of broaching edge portions can be formed, and in this case, they have sectional shapes which gradually and more closely resemble a sectional shape of at least one groove to be finally defined in the cutting blade, when viewed from lower-positioned broaching edge portions toward upper-positioned broaching edge portions.

In the broaching bite having the plurality of broaching edge portions, uppermost-positioned broaching edge portion has a quadrangular sectional shape, broaching edge portions positioned below the uppermost-positioned broaching edge portion have triangular sectional shapes, and the uppermost-positioned broaching edge portion can be spaced apart from the broaching edge portion positioned just below it by a predetermined separation which may be greater than a height of the cutting blade.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1A:
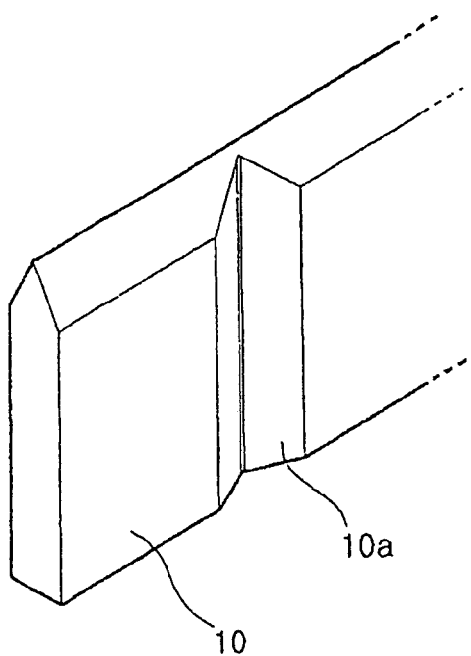
FIG. 1a is a perspective view illustrating a state wherein a triangular groove is defined in a cutting blade.

Reference should now be made to the drawings, in which the same reference numerals are used throughout the different drawings to designate the same or similar components.

Figure 1B:
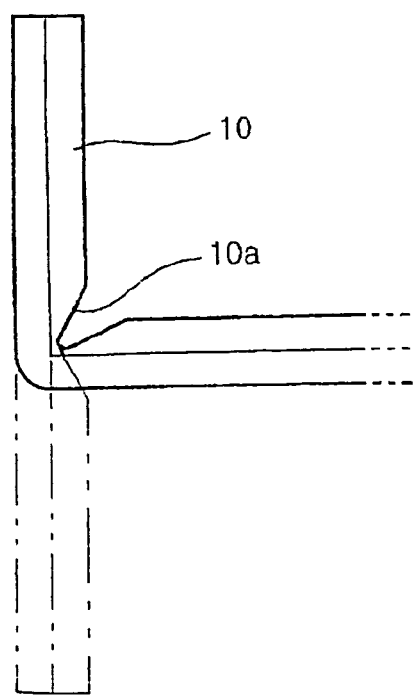
FIG. 1b is a plan view illustrating a state wherein the cutting blade of FIG. 1 is bent along the triangular groove.
Figure 2A:
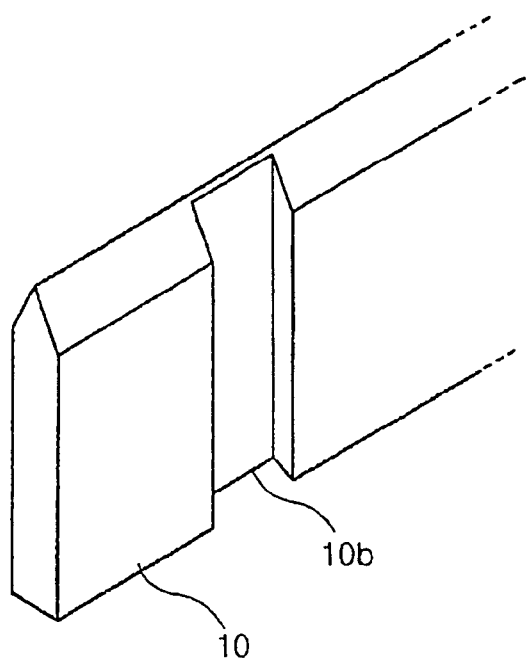
FIG. 2a is a perspective view illustrating a state wherein a quadrangular groove is defined in a cutting blade.
Figure 2B:
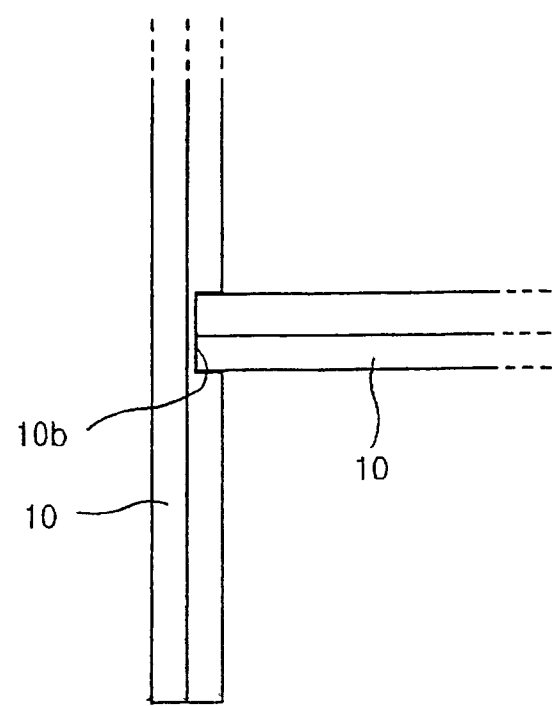
FIG. 2b is a plan view illustrating a state wherein another cutting blade is welded in the quadrangular groove of the cutting blade shown in FIG. 2a in such a way as to create a T-shaped section.
Figure 3:
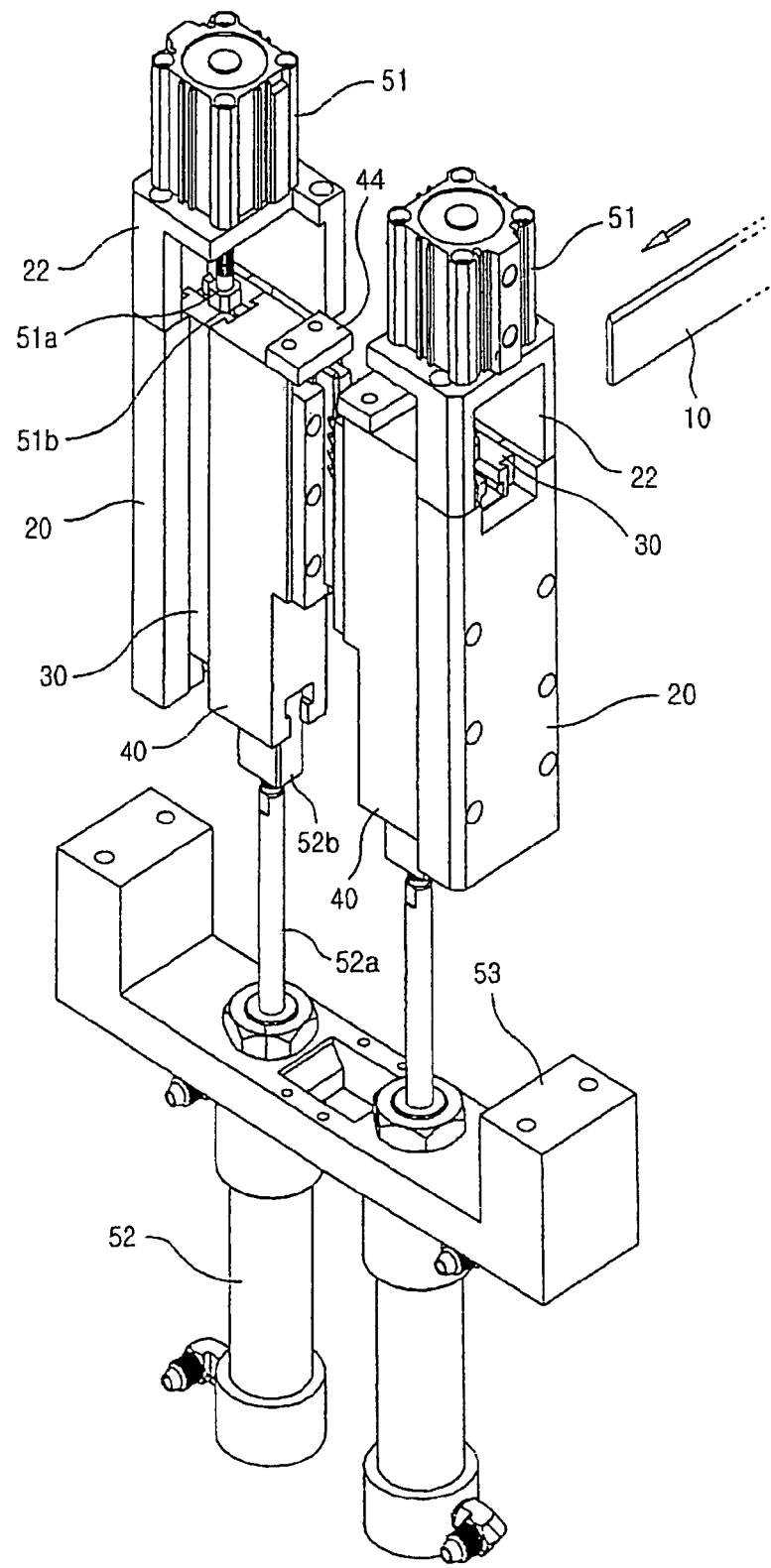
FIG. 3 is a perspective view illustrating an apparatus for defining a groove in a cutting blade in accordance with an embodiment of the present invention.
Figure 4:
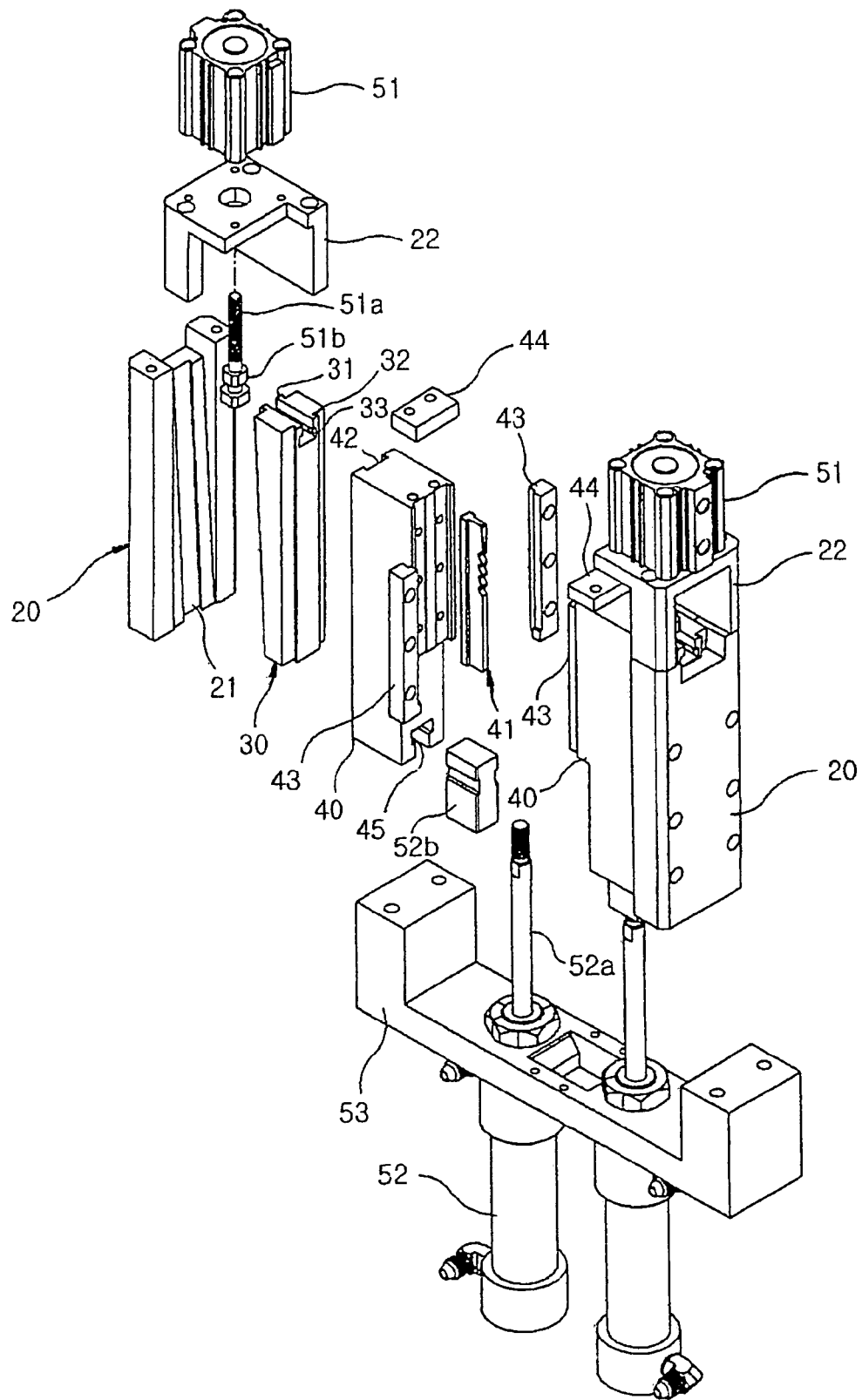
FIG. 4 is a partially exploded perspective view of the apparatus shown in FIG. 3.

FIGS. 1a and 1b illustrate a cutting blade 10 which is defined with a triangular groove 10a using an apparatus according to the present invention and bent along the triangular groove 10a by an angle of 90°. FIGS. 2a and 2b illustrate a cutting blade 10 which is defined with a quadrangular groove 10b using the apparatus according to the present invention and to which another cutting blade 10 is welded in the quadrangular groove 10b to create a T-shaped section.

FIGS. 3 through 7 are views for explaining the apparatus for defining a groove in a cutting blade according to the present invention, which is invented to be adapted for the formation of the grooves 10a and 10b.

In the apparatus for defining a groove in a cutting blade, the cutting blade 10 passes between a pair of broaching bites 41 which are supported by a tunnel-shaped guide unit (not shown) in a cutting blade forming apparatus. That is to say, the apparatus according to the present invention is installed on the cutting blade forming apparatus in such a way as to define the grooves 10a and 10b on one surface or both surfaces of the cutting blade 10 which is held fixed.

The apparatus for defining a groove in a cutting blade according to the present invention comprises a pair of fixed blocks 20, a pair of sliders 30, a pair of bite support blocks 40, and first and second operating mechanisms 51 and 52. The pair of fixed blocks 20 are fixed to a base 12 of the cutting blade forming apparatus to be separated from each other by a predetermined distance and face each other. The pair of sliders 30 are installed on opposite inner surfaces of the fixed blocks 20 to be raised and lowered in a vertical direction and moved in a horizontal direction. The pair of bit support blocks 40 are installed on opposite inner surfaces of the sliders 30 to be raised and lowered in the vertical direction. A pair of broaching bites 41 are fastened to the pair of bite support blocks 40, respectively. The first and second operating mechanisms 51 and 52 function to vertically operate the sliders 30 and the bite support blocks 40 respectively.

When one broaching bite 41 of the bite support blocks 40 selectively defining the groove 10a or 10b on one surface of the cutting blade 10, the other broaching bite 41 support the other surface of the cutting blade 10. The cutting blade 10 is guided and supported by the pair of broaching bites 41 which in turn are supported by the tunnel-shaped guide unit in the cutting blade forming apparatus.

The fixed blocks 20 are provided as a pair and fixed to a base 12 of the cutting blade forming apparatus to be separated from each other by the predetermined distance and face each other. A first dovetail groove 21 serving as a first guide part is defined on an inner surface of each of the opposite fixed blocks 20 to extend from an upper end to a lower end of the fixed block 20. In the first grooves 21, the fixed blocks 20 are formed to have a slope in a manner such that, as the sliders 30 engaged into the first grooves 21 are lowered, the sliders 30 on both sides move horizontally to be closer each other and, as the sliders 30 are raised, the sliders 30 on both sides move horizontally to be more distinct of each other.

The sliders 30 are opposed to each other and installed on the inner surfaces of the fixed blocks 20 in a manner such that they can be raised and lowered. On an outer surface of each slider 30, there is formed a first dovetail 31 serving as a second guide part in a manner such that the first dovetail 31 can be engaged into the first dovetail groove 21 of the fixed block 20. On an inner surface of each slider 30, there is formed a second dovetail 32 serving as a third guide part to extend in the vertical direction. A first horizontal groove 33 for connection with the first operating mechanism 51 is defined at an upper end of the slider 30. The first dovetail 31 of the slider 30 is formed to have a mating slope in accordance with the slope of the first dovetail groove 21 of the fixed block 20 so that the dovetail 31 may slide on the groove 21 without creating a gap therebetween. Since the second dovetail 32 must vertically guide the broaching bite 41 of the bite support block 40, when installing the slider 30 on the fixed block 20, the slider 30 should be generally held upright.

A first cylinder bracket 22 is fastened to an upper end of each fixed block 20, and an air cylinder constituting the first operating mechanism 51 is mounted to the first cylinder block 22. A first piston rod 51a of the air cylinder projects downward, and a first slider block 51b is provided to a free end of the first piston rod 51a. The first slider block 51b is fitted into the first horizontal groove 33 defined on the upper end of the slider 30 to be capable of being moved only in a horizontal direction. While it is illustrated that the first slider block 51b is integrally formed at the lower free end of the first piston rod 51a, it is to be readily understood that the first slider block 51b can be separately formed and coupled to the first piston rod 51a.

The pair of bite support blocks 40 are installed on the inner surfaces, or on the second dovetails 32 of the sliders 30 which are installed opposite to each other, so that the bite support blocks 40 can be raised and lowered. Second dovetail grooves 42 serving as fourth guide parts are defined on outer surfaces of the bite support blocks 40 to be engaged with the second dovetails 32 of the sliders 30. The pair of broaching bites 41 are fastened to inner surfaces of the bite support blocks 40 by first and second bite fastening pieces 43 and 44. A second horizontal groove 45 for connection with the second operating mechanism 52 is defined at a lower end of each bite support block 40.

Mounting of the broaching bites 41 is enabled by two first bite fastening pieces 43 which are formed to surround a lower end and both sides surfaces of the broaching bite 41 and the second bite fastening piece 44 for fastening an upper end of the broaching bite 41. At this time, in order to ensure that the broaching bite 41 can be removed by unfastening the second bite fastening piece 44, the broaching bite 41 is slidably intervened between the bite support block 40 and the first bite fastening pieces 43.

A second cylinder bracket 53 is secured to the base 12 which is positioned below the fixed blocks 20, sliders 30 and the bite support blocks 40. A hydraulic cylinder constituting the second operating mechanism 52 is mounted to the second cylinder bracket 53. A second piston rod 52a of each hydraulic cylinder projects upward, and a second slider block 52b is provided to a free end of the second piston rod 52a. The second slider block 52b is fitted into the second horizontal groove 45 defined on the lower end of the bite support block 40 to be capable of being moved only in the horizontal direction. While it is illustrated that the second slider block 52b is integrally formed at the upper free end of the second piston rod 52a, it is to be readily understood that the second slider block 52b can be separately formed and coupled to the second piston rod 52a.

Each broaching bite 41 has a bite base 41a which is relatively wide and fastened to the bite support block 40 by the first and second bite fastening pieces 43 and 44, and a bite body 41b which is narrower width than the bite base 41a and projects from an inner surface of the bite base 41a with a predetermined thickness. A lower portion of the bite body 41b is formed as a supporting surface portion 41c for supporting a side surface of the cutting blade 10, and a plurality of broaching edge portions 41d are formed from an upper end of the supporting surface portion 41c.

The broaching edge portions 41d are formed in a manner such that, when lower pulling force is applied to them, they can define the grooves 10a and 10b in the cutting blade 10. The plurality of broaching edge portions 41d are formed in a manner such that they have sectional shapes which gradually and more closely resemble sectional shapes of the grooves 10a and 10b to be finally defined in the cutting blade 10, when viewed from lower-positioned broaching edge portions 41d toward upper-positioned broaching edge portions 41d. Accordingly, when the grooves 10a and 10b are defined in the cutting blade 10 by the broaching bites 41, portions of the grooves 10a and 10b are first defined in the cutting blade 10 by the lower-positioned broaching edge portions 41d, and, thereafter, the grooves 10a and 10b are finally defined by the uppermost-positioned broaching edge portion 41*d*. Therefore, the grooves 10*a* and 10*b* can be accurately defined by the broaching process.

According to the preferred example of the present invention, in the broaching bite 41, the uppermost-positioned broaching edge portion 41*d* has a quadrangular sectional shape, and the broaching edge portions 41*d* positioned below the uppermost-positioned broaching edge portion 41*d* have triangular sectional shapes. The uppermost-positioned broaching edge portion 41*d* is spaced apart from the broaching edge portion 41*d* positioned just below it by a predetermined separation. This separation can be greater than a height of the cutting blade 10.

In the broaching bite 41, projecting distances of the broaching edge portions 41*d* measured from the supporting surface portion 41*c* toward the cutting blade 10 are determined depending upon a thickness of a cutting blade 10 to be machined. The projecting distances mean machining depths of the grooves 10*a* and 10*b*. At this time, the machining depths of the grooves 10*a* and 10*b* are determined in consideration of the fact that a cutting edge of the cutting blade 10 must not be damaged. In this regard, the grooves 10*a* and 10*b* should be separated from the cutting edge by a distance of at least 0.05 mm. The reason for this is that, if the cutting edge of the cutting blade 10 is damaged, initial sheet products are not reliably cut upon implementing a tailoring process.

While it was illustrated in the drawings that each broaching bite 41 has at least two broaching edge portions 10*d*, it is also possible to form only one triangular or quadrangular broaching edge portion.

Hereafter, a procedure for defining the triangular groove 10*a* using the apparatus according to the present invention, constructed as mentioned above, will be described in detail.

Figure 8A:
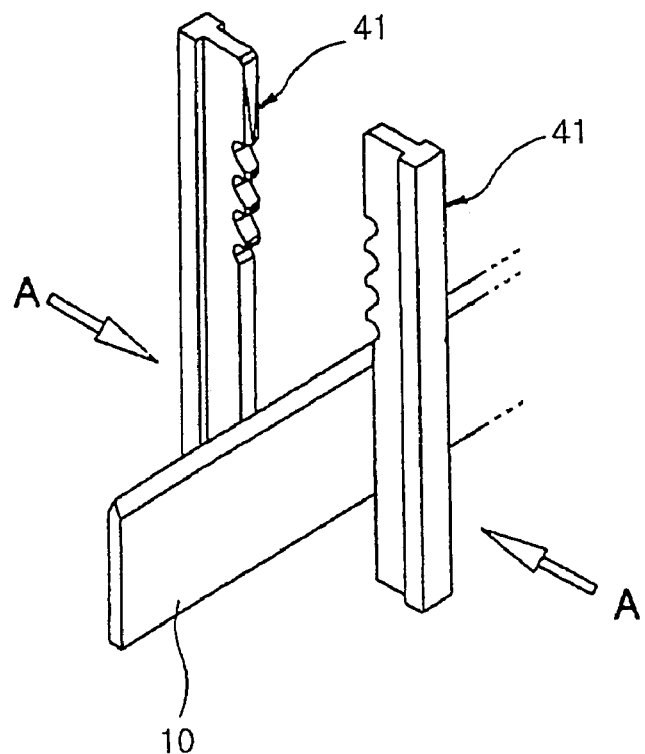
FIGS. 8a through 8e are views sequentially illustrating a procedure for defining a triangular groove in a cutting blade using the apparatus according to the present invention.

First, as shown in FIG. 8*a*, in a state wherein the sliders 30 and the bite support blocks 40 are set to an initial upper position and the distance between the pair of broaching bites 41 are widened, the cutting blade 10 is supplied. At this time, when the cutting blade 10 approaches a position where the triangular groove 10*a* is to be defined, movement of the cutting blade 10 is stopped.

With the cutting blade 10 stopped in this way, by operating the first operating mechanisms 51 which are mounted to the first cylinder brackets 22 positioned above the fixed blocks 20, the first piston rods 41*a* of the first operating mechanisms 51 project downward, by which the sliders 30 connected through the first slider blocks 51*b* provided to the free ends of the first piston rods 51*a* are moved downward.

Figure 5:
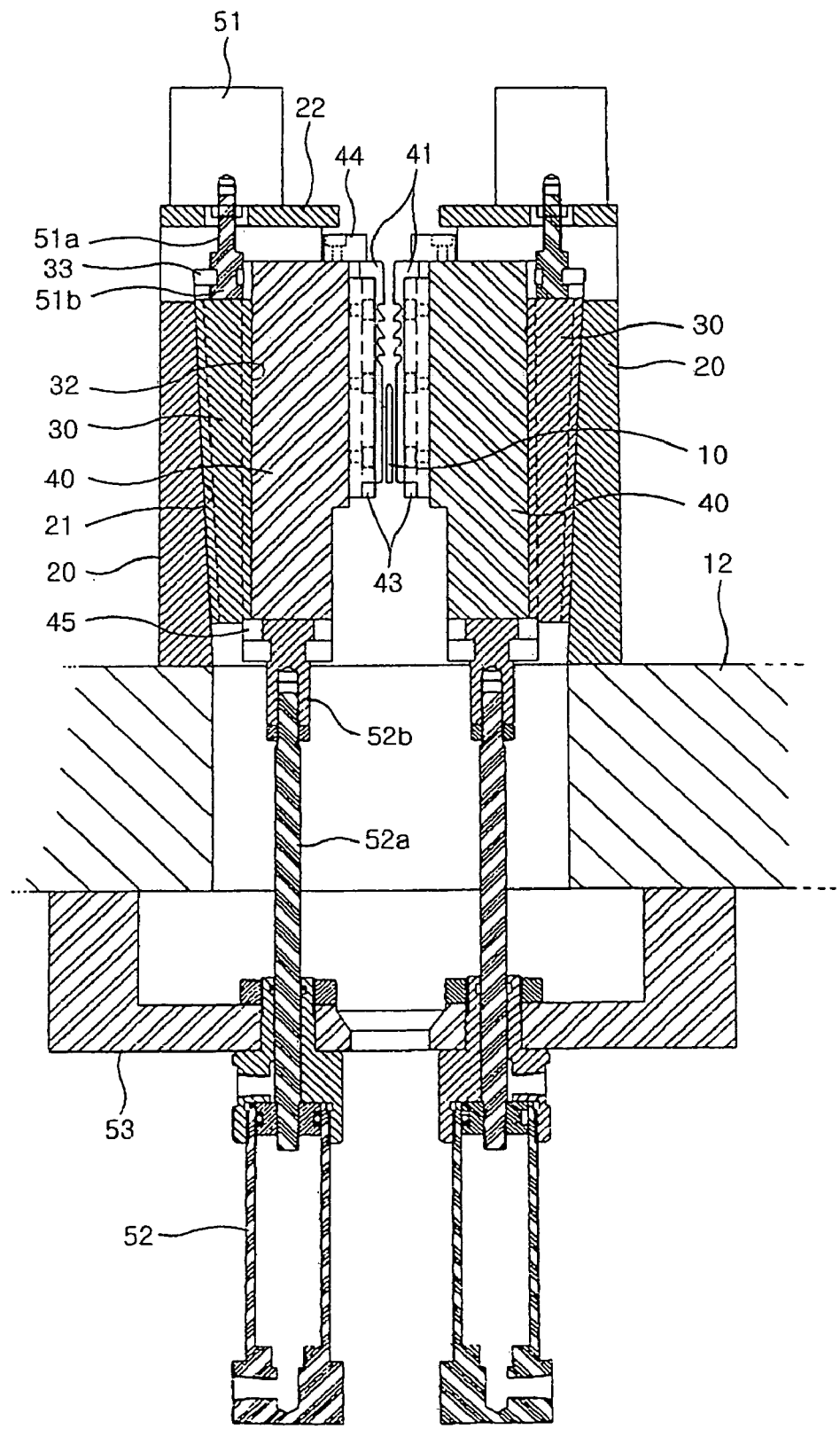
FIG. 5 is a sectional view illustrating a state wherein the apparatus for defining a groove in a cutting blade according to the present invention is mounted to a cutting blade forming apparatus.
Figure 6:
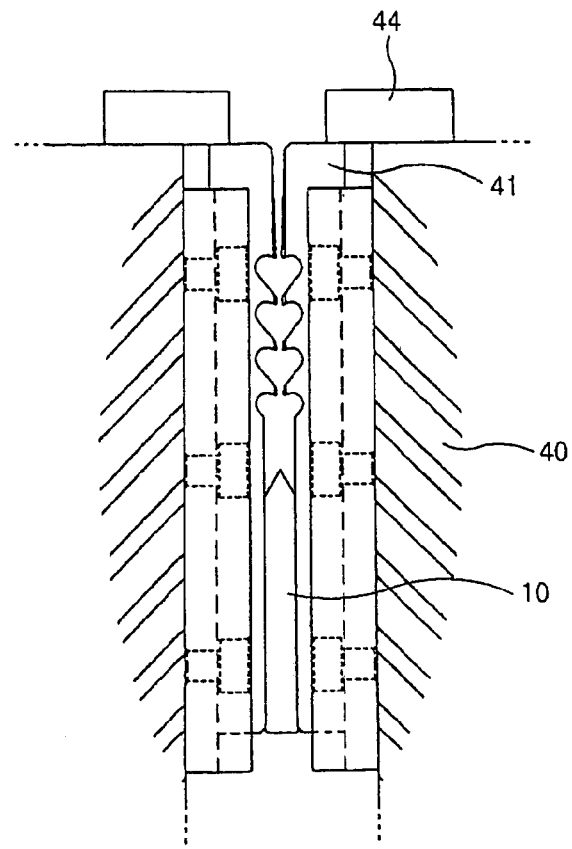
FIG. 6 is a front view illustrating a state wherein a pair of broaching bites grasp a cutting blade in FIG. 5.
Figure 7:
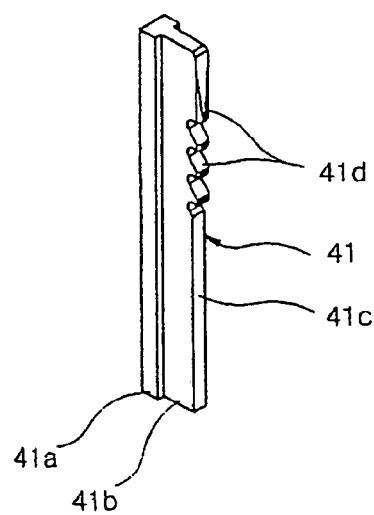
FIG. 7 is a perspective view independently illustrating a broaching bite according to the present invention.
Figure 8B:
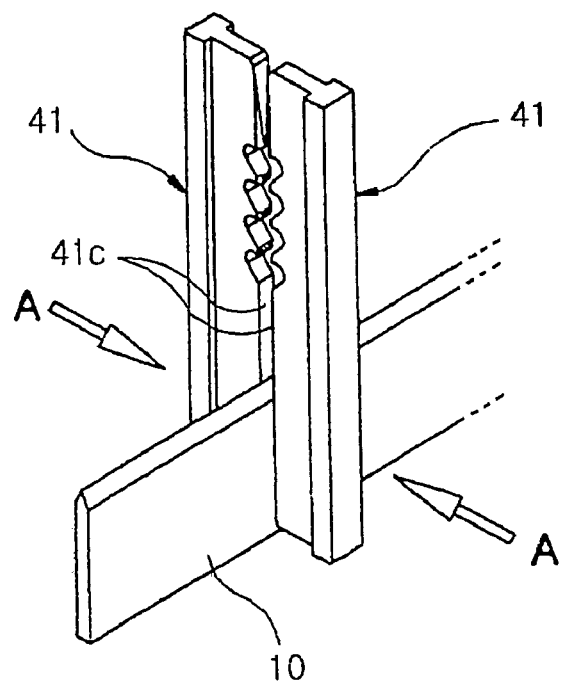

When the sliders 30 are moved downward, due to the fact that the first dovetail groove 21 of the fixed block 20, serving as the first guide part, and the first dovetail 31 of the slider 30, serving as the second guide part, are formed to have the predetermined slope, the sliders 30 and the bite support blocks 40 are horizontally moved toward the cutting blade 10. As a consequence, as shown in FIGS. 5 and 8*b*, the supporting surface portions 41*c* of the broaching bites 41 which are mounted to the bite support blocks 40 are brought into contact with both side surfaces of the cutting blade 10 to support the cutting blade 10.

Figure 8C:
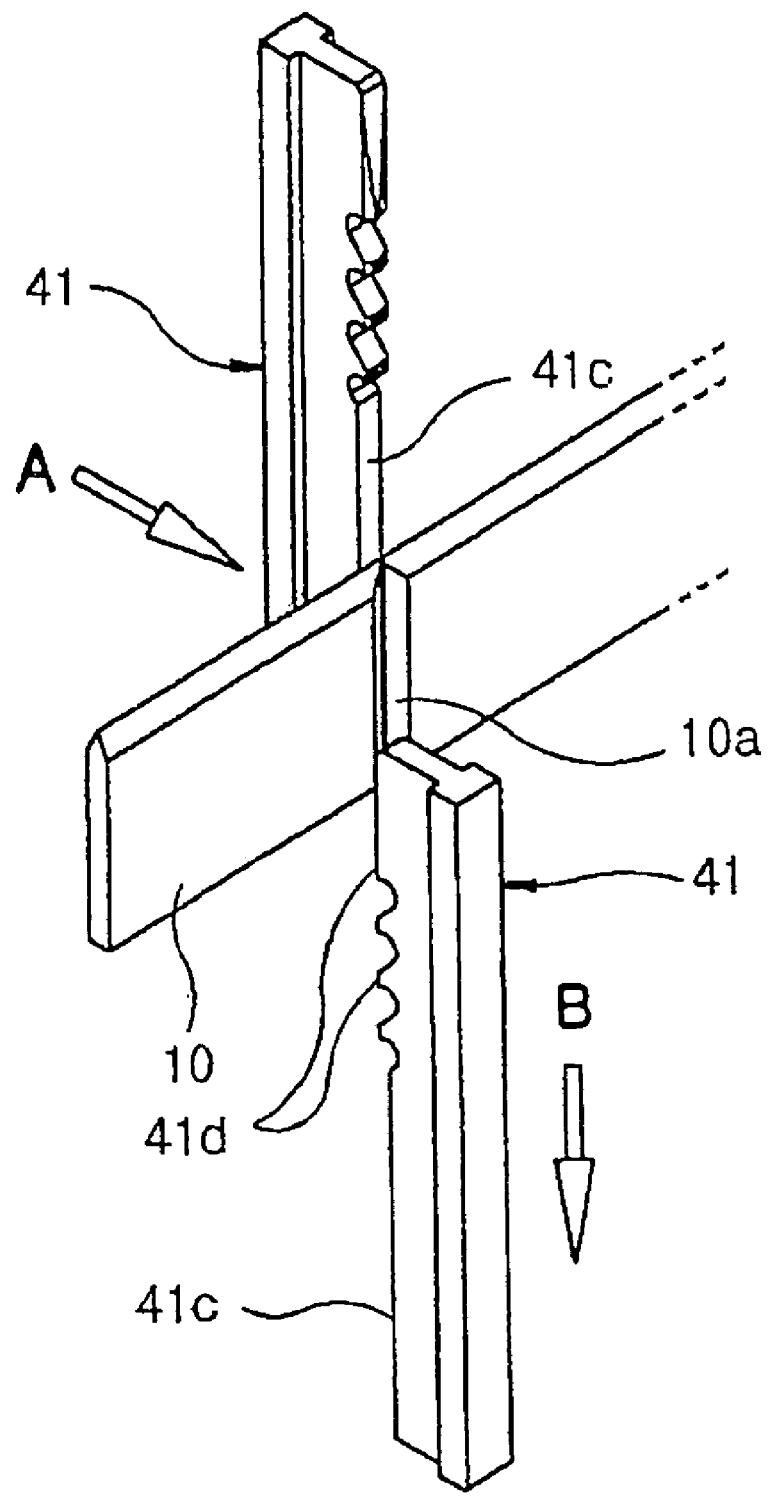

In this state, as shown in FIG. 8*c*, as the hydraulic cylinder constituting the second operating mechanism 52, which is placed at a side where the groove 10*a* or 10*b* is defined, the second piston rod 52*a* is lowered, by which the bite support block 40 connected through the second slider block 52*b* provided at the upper free end of the second piston rod 52*a* is lowered. At this time, since the second dovetail 32 of the slider 30, serving as the third guide part, is engaged in an upright state with the second dovetail groove 42 of the bite support block 40, serving as the fourth guide part, the broaching bite 41 of the corresponding bite support block 40 is moved downward in the upright state.

As one broaching bite 41 is lowered in this way, the broaching edge portions 41*a* thereof cut the one surface of the cutting blade 10 to define, for example, the triangular groove 10*a*. When the one broaching bite 41 is lowered as described above, the other broaching bite 41 maintained in a fixed state wherein the supporting surface portion 41*c* of the other broaching bite 41 supports the other surface of the cutting blade 10, whereby deformation of the cutting blade 10 is prevented and it is possible to precisely define the triangular groove 10*a* in the cutting blade 10.

At this time, as described above, the broaching bite 41 has the plurality of broaching edge portions 41*d*, and the plurality of broaching edge portions 41*d* are formed in a manner such that they have sectional shapes which gradually and more closely resemble the sectional shape of the triangular groove 10*a*, when viewed from a lower position adjoining the cutting blade 10 toward an upper position separated from the cutting blade 10. Therefore, when the broaching bite 41 defines the groove in the cutting blade 10, cutting resistance is generated to a relatively low extent, and a machining load due to the formation of the triangular groove 10*a* can be reduced.

Also, in consideration of the fact that each broaching bite 41 has the triangular broaching edge portions 41*d* for bending of the cutting blade 10 and the quadrangular broaching edge portions 41*d* for welding of another cutting blade 10 to create a T-shaped section, it is possible to define not only the triangular groove 10*a* but also the quadrangular groove 10*b* using the broaching bites 41.

In the broaching bite 41 employed in the above-described apparatus, projecting distances of the broaching edge portions 41*d* measured from the supporting surface portion 41*c* toward the cutting blade 10 are determined depending upon a thickness of a cutting blade 10 to be machined. The projecting distances mean machining depths of the grooves 10*a* and 10*b*. At this time, the machining depths of the grooves 10*a* and 10*b* are determined in consideration of the fact that the cutting edge of the cutting blade 10 must not be damaged. In this regard, the grooves 10*a* and 10*b* are separated from the cutting edge by a distance of 0.05 mm. The reason for this is that, if the cutting edge of the cutting blade 10 is damaged, initial sheet products are not reliably cut upon implementing the tailoring process.

If the triangular groove 10*a* is defined in the cutting blade 10 as the one broaching bite 41 is completely lowered as described above, the air cylinder constituting the first operating mechanism 51 of the first cylinder bracket 22 positioned above the fixed block 20 is operated, by which the first piston rod 51*a* of the first operating mechanism 51 is inserted upward into the air cylinder to be returned to its initial position. Subsequently, the slider 30 connected through the first slider block 51*b* provided to the free end of the first piston rod 51*a* is also moved upward.

Figure 8D:
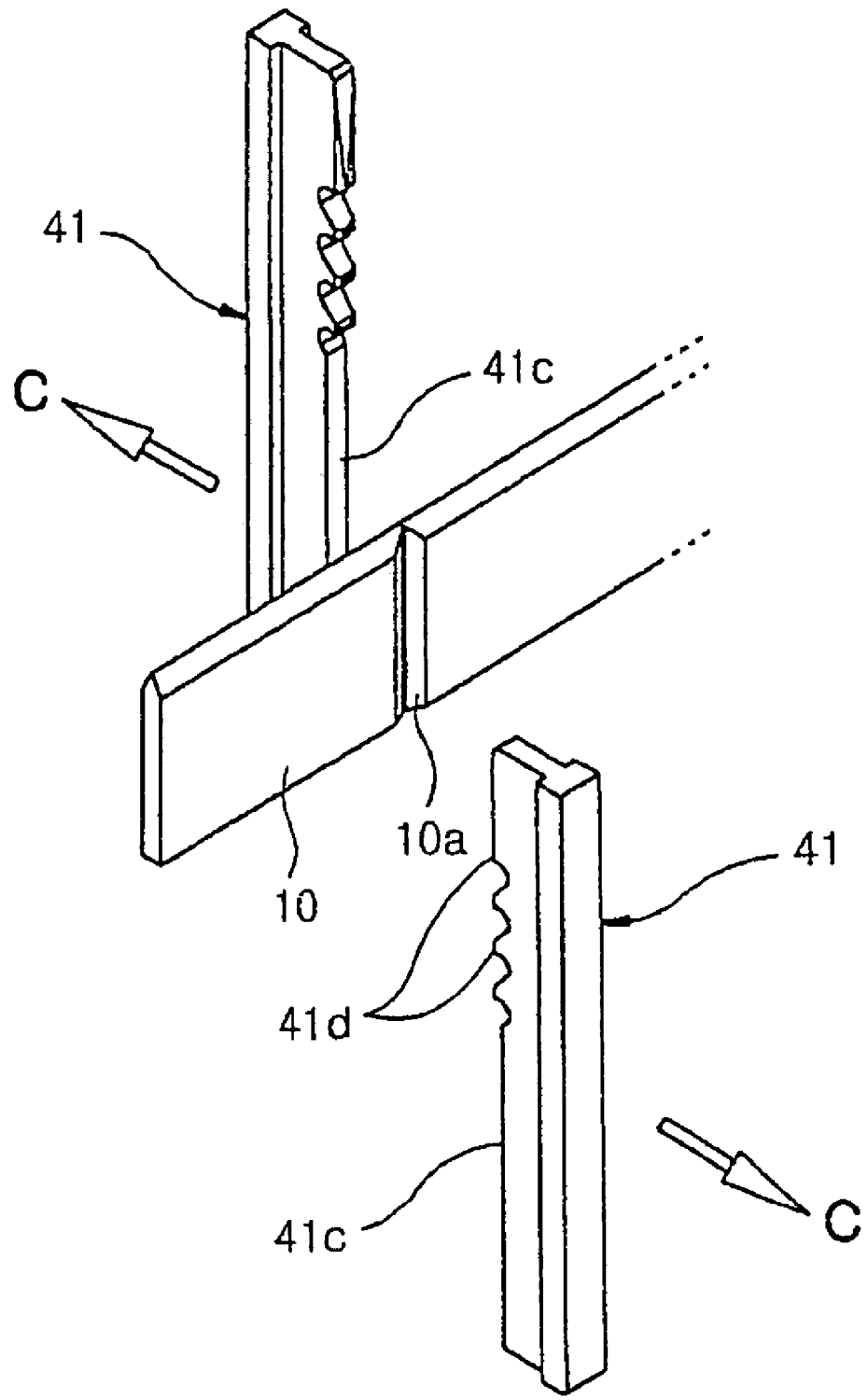

As the slider 30 is moved upward in this way, due to the fact that the first dovetail groove 21 of the fixed block 20, serving as the first guide part, and the first dovetail 31 of the slider 30, serving as the second guide part, are formed to have the predetermined slope, as shown in FIG. 8*d*, the sliders 30 and the bite support blocks 40 are horizontally moved outward from the cutting blade 10. As a consequence, the supporting surface portions 41*c* of the broaching bites 41 which are mounted to the bite support blocks 40 are separated from both side surfaces of the cutting blade 10.

Figure 8E:
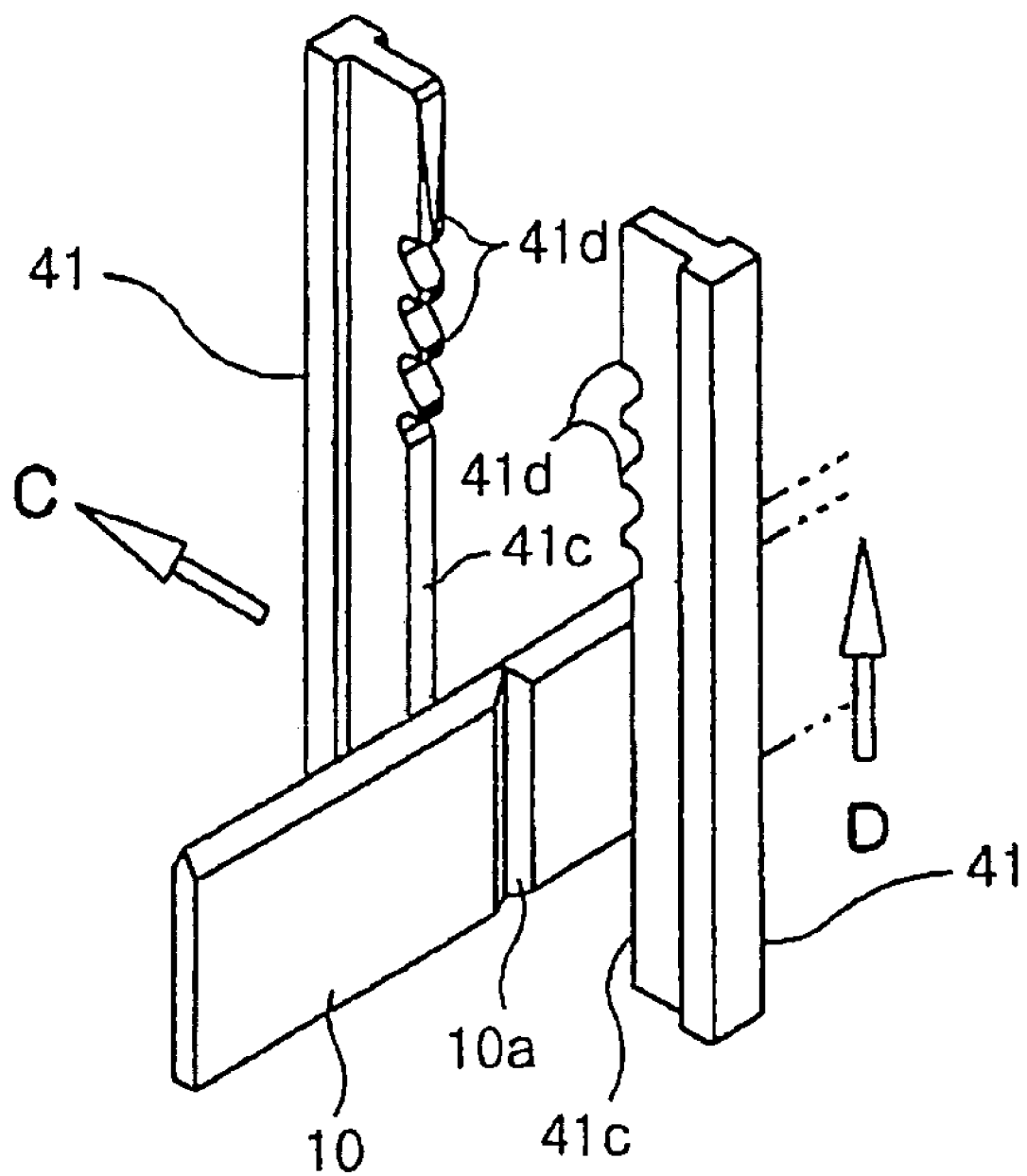

In a state wherein the broaching bites 41 are moved outward from the cutting blade 10 as described above, as shown in FIG. 8e, by operating again the hydraulic cylinder constituting the second operating mechanism 52 which is placed at the side where the triangular groove 10a is defined, the second piston rod 52a of the hydraulic cylinder is moved upward toward its original position, and the bite support block 40 connected through the second slider block 52b provided to the upper free end of the second piston rod 52a is also moved upward.

Accordingly, since the broaching bites 41 are moved upward in a state wherein they are not brought into contact with the cutting blade 10, friction is not caused, degradation of the broaching bites 41 is prevented, and a lifetime of the broaching bites 41 are lengthened. At this time, since the second dovetail 32 of the slider 30, serving as the third guide part, is engaged in an upright state with the second dovetail groove 42 of the bite support block 40, serving as the fourth guide part, the broaching bite 41 of the corresponding bite support block 40 is moved upward in the upright state to be returned to its initial position.

As the entire procedure is finished as described above and the broaching bites 41 are returned to their initial positions, the cutting blade 10 is fed by a distance programmed in advance toward a place where another triangular groove 10a is to be defined on the cutting blade 10.

The above description is given for explaining operation of the present apparatus in connection with the formation of the triangular groove 10a on one surface of the cutting blade 10, and when it is necessary to define the triangular groove 10a on the other surface of the cutting blade 10, the other broaching bite 41 which is positioned opposite to the one broaching bite 41 can be used.

The series of processes as described above are repeated as occasion demands to obtain the cutting blade 10 having the desired configuration. At this time, since the further processes are implemented in the same manner, concrete description thereof will be omitted herein.

While it was described that the triangular groove 10a is defined by the broaching bite 41, since the broaching bites 41 of the present invention has the triangular broaching edge portions 41d for bending of the cutting blade 10 and the quadrangular broaching edge portions 41d for welding of another cutting blade 10 to create the T-shaped section, it is possible to define not the triangular groove 10a but also the quadrangular groove 10b.

The quadrangular groove 10b is employed in a manner such that welding of another cutting blade 10 is implemented in the quadrangular groove 10b of the cutting blade 10. This is effected by the fact that the broaching edge portions 41d which are formed on the lower portion of the broaching bite 41 are used to define the triangular groove 10a, and the broaching edge portion 41d, which is positioned on the upper portion of the broaching bite 41 and is spaced apart from the broaching edge portion 41d positioned just below it by a predetermined separation which may be greater than a height of the cutting blade 10, is used to define the quadrangular groove 10b.

Describing by reference a procedure of defining the triangular and quadrangular grooves 10a and 10b on the cutting blade 10, strokes of the second piston rods 52a of the hydraulic cylinders constituting the second operating mechanism 52 can be adjusted in a manner such that the triangular groove 10a as shown in FIG. 1a is defined in the cutting blade 10 using the triangular broaching edge portions 41d or the quadrangular groove 10b as shown in FIG. 2a is defined in the cutting blade 10 using the quadrangular broaching edge portion 41d.

That is to say, in consideration of the fact that the broaching edge portion 41d is positioned on the upper portion of the broaching bite 41 and spaced apart from the broaching edge portion 41d positioned just below it by a predetermined separation when it is needed to define the triangular groove 10a in the cutting blade 10, a stroke of the second piston rod 52a of the hydraulic cylinder constituting the second operating mechanism 52 is adjusted in a manner such that the uppermost quadrangular broaching edge portion 41d may be prevented from being brought into contact with the cutting blade 10, and when it is needed to define the quadrangular groove 10b in the cutting blade 10, a stroke of the second piston rod 52a of the hydraulic cylinder constituting the second operating mechanism 52 is adjusted such that the uppermost quadrangular broaching edge portion 41d may be fully brought into contact with the cutting blade 10, thus further machining triangular groove previously formed on the cutting blade 10 into an accurate quadrangular groove.

INDUSTRIAL APPLICABILITY

As apparent from the above description, the apparatus for defining a groove in a cutting groove provides advantages in that, since the groove to be opened in a bending direction of the cutting blade is defined on one surface of the cutting blade with the other surface of the cutting blade supported by appropriate means, deformation of the cutting blade is prevented, and it is possible to precisely define the groove.

Further, in which, after the groove is defined, because a broaching bite is returned to its initial position while being retreated from the cutting blade not to be brought into contact with the cutting blade, it is possible to prevent frictional heat from being generated due to contact between the bite and the cutting blade.

Moreover, in the present invention, a triangular bending groove can be defined using a single broaching bite, and a quadrangular groove for ensuring an increased strength when welding the other cutting blade in the quadrangular groove of one cutting blade to create a T-shaped section can be easily defined.

While it was described in the above embodiment that first and second driving mechanisms respectively comprise an air cylinder and a hydraulic cylinder, a person skilled in the art will readily recognize that the first and second driving mechanisms may comprise motors, etc.

The invention claimed is:

1. An apparatus for defining a groove in a cutting blade, comprising:
a pair of fixed blocks fixed to a base of a cutting blade forming apparatus to be separated from each other by a predetermined distance, and formed on respective surfaces facing each other with first guide parts which extend in a vertical direction;
a slider having a second guide part and a third guide part, the second guide part being formed on one surface of the slider and engaged with the first guide part of each fixed block in such a way as to be raised and lowered in the vertical direction, and the third guide part being formed on another surface of the slider, farthest from the one surface, to extend in the vertical direction;
a bit support block having a fourth guide part formed on one surface thereof and a broaching bit fixed to another surface thereof, the fourth guide part being engaged with the third guide part of the slider in such a way as to be raised and lowered in the vertical direction; and first and second operating mechanisms for operating the slider and the bit support block, respectively, in the vertical direction.

2. The apparatus as set forth in claim 1, wherein the first guide part of the fixed block and the second guide part of the slider are engaged with each other in such a way as to constitute a first dovetail joint, and the third guide part of the slider and the fourth guide part of the support block are engaged with each other in such a way as to constitute also a second dovetail joint.

3. The apparatus as set forth in claim 1 wherein the first guide parts of the fixed blocks and second guide parts of sliders are formed to have a slope, in a manner such that, as the sliders are lowered, an interval measured between the respective sliders is narrowed, and, as the sliders are raised, the interval is widened.

4. The apparatus as set forth in claim 1, wherein, in order to allow horizontal movement of the bit slider and support block while the slider is moved in the vertical direction, opposite ends of the slider and bit support block are respectively formed with first and second horizontal grooves, and first and second slider blocks are provided to free ends of first and second piston rods of the first and second operating mechanisms and movably fitted into the first and second horizontal grooves, respectively.

5. The apparatus as set forth in claim 1, wherein a lower portion of an edge of the broaching bit is formed as a supporting surface portion for supporting a side surface of the cutting blade, and at least one broaching edge portion is formed above upper portion of the supporting surface portion.

6. The apparatus as set forth in claim 5, wherein the broaching edge portion has a triangular sectional shape.

7. The apparatus as set forth in claim 5, wherein the broaching edge portion has a quadrangular sectional shape.

8. The apparatus as set forth in claim 5, wherein a plurality of broaching edge portions are formed in a manner such that they have sectional shapes which gradually and more closely resemble a sectional shape of at least one groove to be finally defined in the cutting blade, when viewed from lower-positioned broaching edge portions toward upper-positioned broaching edge portions.

9. The apparatus as set forth in claim 8, wherein uppermost-positioned broaching edge portion has a quadrangular sectional shape, broaching edge portions positioned below the uppermost-positioned broaching edge portion have triangular sectional shapes, and the uppermost-positioned broaching edge portion is spaced apart from the broaching edge portion positioned just below it by a predetermined separation which may be greater than a height of the cutting blade.

10. The apparatus as set forth in claim 2, wherein the first guide parts of the fixed blocks and second guide parts of sliders are formed to have a slope, in a manner such that, as the sliders are lowered, an interval measured between the respective sliders is narrowed, and, as the sliders are raised, the interval is widened.

\* \* \* \* \*